United States Patent

[11] 3,593,890

[72] Inventor Ian Archie MacKinnon
    Burlington, Ontario, Canada
[21] Appl. No. 735,761
[22] Filed June 10, 1968
[45] Patented July 20, 1971
[73] Assignee Lely Ltd.
    Burlington, Canada
[32] Priority June 16, 1967, Jan. 15, 1968
[33] Netherlands
[31] 67,08369 and 68,00580

[54] AGRICULTURAL MACHINE WITH SPREADER
    19 Claims, 8 Drawing Figs.
[52] U.S. Cl. .................................................. 222/176,
    280/489
[51] Int. Cl. ............................................... A01c 19/00
[50] Field of Search ......................................... 222/176,
    177; 280/489, 493, 491.2, 124.1, 5 E, 5 D, 414;
    239/675, 661, 664, 670, 663, 668, 672; 298/7, 24,
    27

[56] References Cited
    UNITED STATES PATENTS
2,385,253   9/1945   Black .................... 280/489 X
2,590,962   4/1952   Gurton et al. ............ 280/489 X
2,966,369   12/1960  Paul, Jr. ................ 280/489
2,609,212   9/1952   McMurtrie ............... 280/124.1 X
3,218,083   11/1965  Van Der Lely et al. ..... 239/675
3,300,223   1/1967   Vissers ................. 222/176
3,365,103   1/1968   Van Der Lely et al. ..... 222/176
    FOREIGN PATENTS
1,406,017   6/1965   France .................. 289/489
1,357,102   2/1963   France .................. 280/489
1,407,799   6/1964   France .................. 280/489
272,447     3/1951   Switzerland ............. 280/489

Primary Examiner—Stanley H. Tollberg
Assistant Examiner—David A. Scherbel
Attorney—Mason, Mason, and Albright ABSTRACT: The invention relates to an agricultural machine having a frame and a supply hopper mounted on the frame. The frame has four ground wheels and a resiliently mounted drawbar which is vertically adjustable relative to the frame. The frame includes a plurality of support beams and struts so that a heavy load can be carried in the hopper. Resilient elements are associated with the ground wheels and frame to absorb shocks when the machine is moved over uneven ground.

PATENTED JUL 20 1971

INVENTOR
IAN ARCHIE MACKINNON
by Mason, Mason & Albright
Attorneys

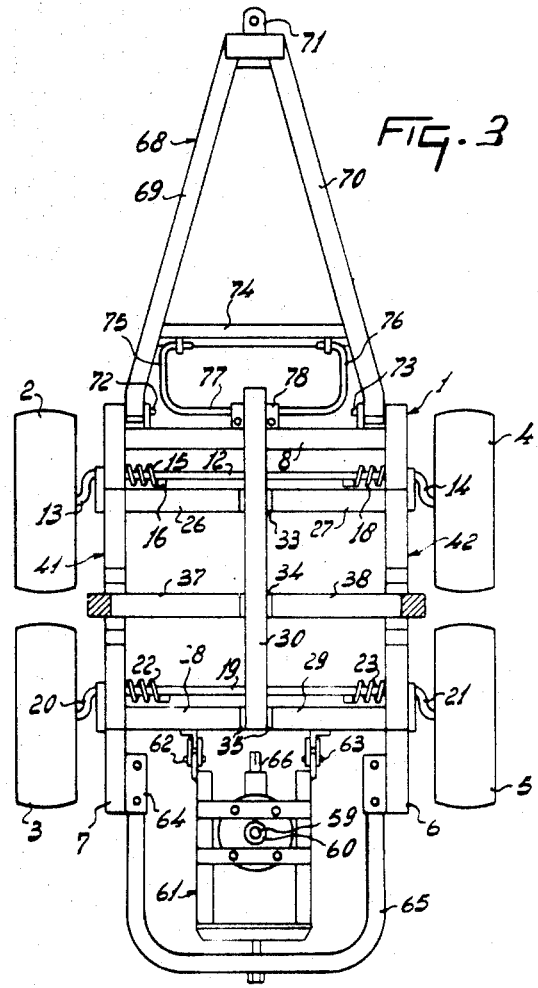

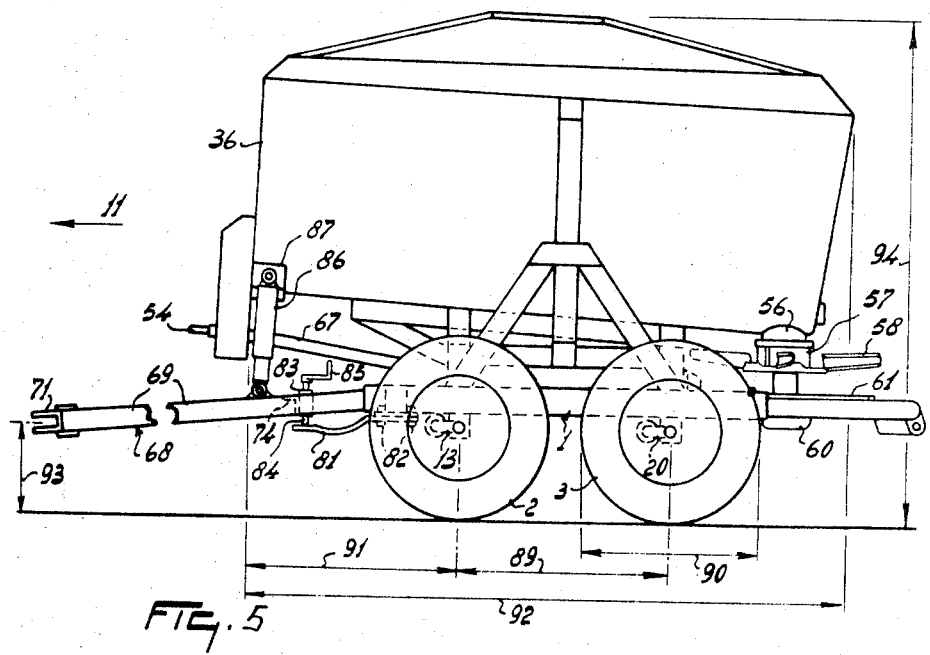
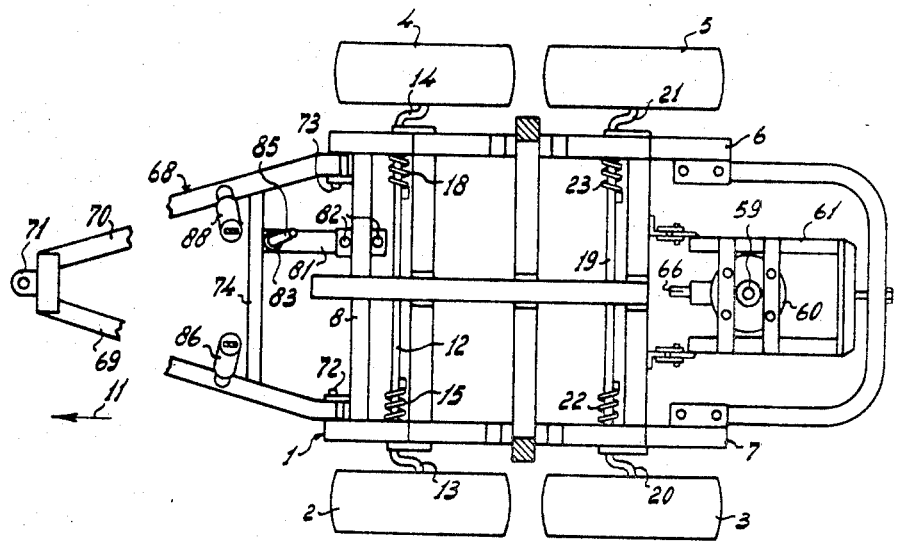

AGRICULTURAL MACHINE WITH SPREADER

The invention has for its object *inter alia* to provide a simple, easily controllable machine of the kind set forth.

In accordance with the invention this can be achieved by arranging a spring mechanism between the drawbar and the frame for exerting a force on the drawbar in upward direction relative to the frame.

In a simple embodiment of the machine according to the invention the spring mechanism is formed by a torsional rod spring. An advantageous embodiment of the machine according to the invention can be obtained by providing the supply hopper with an outlet port in the proximity of which a spreading member is arranged. The machine can be effectively used for distributing, for example, fertilizers, on land.

In a further embodiment of the machine according to the invention the ground wheels are each movable independently of the other and resiliently fastened to the frame. The material carried in the supply hopper is thus exposed only to a slight extent or not at all to shocks of the machine during a travel across, for example, a field. A simple, robust frame capable of supporting a large hopper can be obtained in a further embodiment of the machine according to the invention by using an elongated hopper tapering in downward direction viewed in a vertical sectional view, the frame comprising a frame beam extending along the narrow bottom side of the hopper and being secured thereto.

The invention furthermore relates to an agricultural machine comprising a frame and a supply hopper arranged on said frame, said frame being provided with two pairs of ground wheels and a drawbar adjustable in a direction of height relative to the frame and serving to draw the machine, while between the drawbar and the frame there is arranged at least one shock absorber. In this way the movements of the machine relative to the prime mover, for example, a tractor, are attenuated so that a more quiet travel of the machine across uneven land is ensured.

For a better understanding of the invention and to show how the same may be readily carried into effect, reference is made by way of example to the accompanying drawing.

FIG. 3 is a plan view of the frame of the machine shown in FIG. 1, the supply hopper and the spreading member being omitted.

FIG. 4 is a sectional view taken on the line IV—IV in FIG. 1 of part of the machine.

FIG. 5 is a side elevation of a further machine embodying the invention for spreading material.

FIG. 6 is a plan view of the frame of the machine shown in FIG. 5, the hopper and the spreading member being omitted.

FIG. 7 shows a further embodiment of a detail of the machine shown in FIG. 5 and 6.

FIG. 8 shows a further embodiment of the leaf spring connection between the frame and the drawbar.

Figure 1:
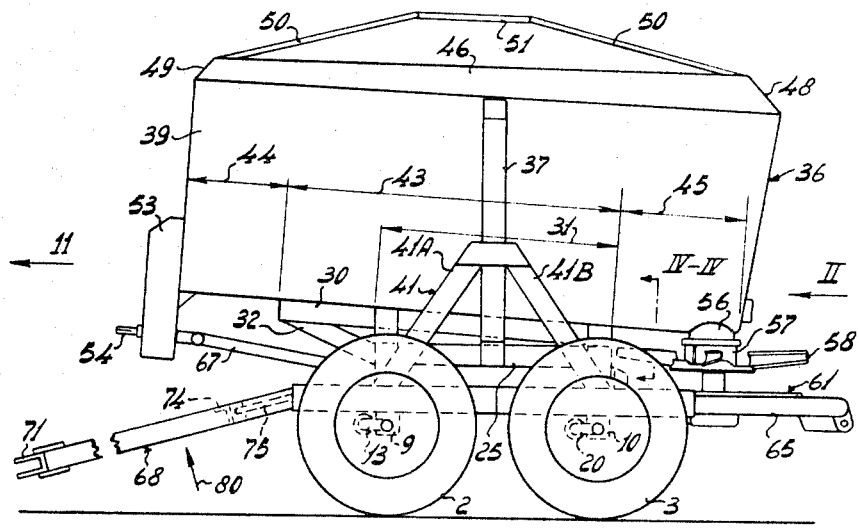
FIG. 1 is a side elevation of an agricultural machine according to the invention for spreading material.

The machine comprises a frame 1, supported from four ground wheels 2, 3, 4 and 5. The frame comprises a U-shaped frame portion extending in a horizontal plane and having limbs 6 and 7, forming longitudinal beams, and a front beam 8. To the lower sides of the longitudinal beams 6 and 7 are secured transverse beams 9 and 10. Viewed in the direction of travel 11 of the machine a ground wheel axle 12 is arranged in front of the transverse beam 9 and rigidly secured to the frame. Cranks 13 and 14 are arranged at the ends of the axle 12 so as to be rotatable to the latter. The wheel 2 is secured to the end of the crank 13 and the wheel 4 is fastened to the end of the crank 14. Near the crank 13 the end of the axle 12 is surrounded by a helical spring 15, one end of which is inserted into a tag 16, secured to the axle 12. The other end of the spring 15 is secured to the crank 13 so that the spring tends to urge the crank down relative to the axle 12. As described for the crank 13, the crank 14 is provided with a helical spring 18. An axle 19 is arranged in front of the transverse beam 10, viewed in the direction of travel 11, said axle having cranks 20 and 21, to which the ground wheels 3 and 5 respectively are secured. In the same manner as is described for the crank 13, the cranks 20 and 21 are connected with springs 22 and 23, which surround the ends of the axle 19.

Centrally above the transverse beams 9 and 10 a supporting beam 25 is connected by means of struts 26 and 27 with the ends of the beam 9. The supporting beam 25 is connected with the beam 10 by means of struts 28 and 29, which extend from the beam 25 obliquely downwards towards the ends of the beam 10. Above the supporting beam 25 a supporting beam 30 extends, viewed in the direction of travel 11, from the rear side of the central beam 25 obliquely upwards and, viewed in the direction of travel 11, further to the front than the supporting beam 25. The supporting beam 25 extends over a distance 31, which is equal to the distance between the beams 9 and 10. Between the front side of the supporting beam 25 and the supporting beam 30 a strut beam 32 is provided. The beam 30 is furthermore connected with the beam 25 by means of supports 33, 34 and 35. To the supporting beam 30 is secured an elongated hopper 36, provided with lateral supporting beams 37 and 38. The longitudinal direction of the hopper extends parallel to the direction of ravel 11.

Figure 2:
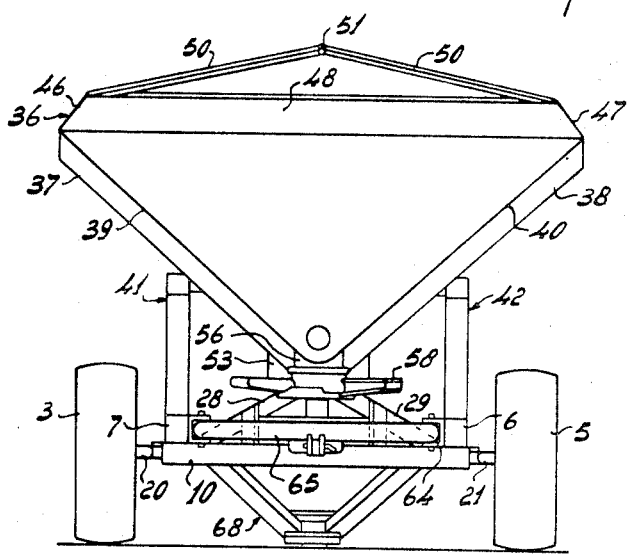
FIG. 2 is a rear view of the machine shown in FIG. 1 in the direction of the arrow II in FIG. 1.

As is shown in FIG. 2, the hopper has a V-shaped cross-sectional area, tapering in downward direction, the narrow bottom side bearing on the supporting beam 30. The lateral supporting beams 37 and 38 extend from the beam 30 along the oblique sides 39 and 40 of the hopper 36 up to the upper side thereof. The hopper 36 is rigidly secured to the lateral supporting beams 37 and 38 and to the supporting beam 30. The lateral supporting beams 37 and 38 are connected with the beam 30 near the supports 34. Midway in the direction of length the beams 37 and 38 are furthermore held by lateral supports 41 and 42, having the same shape and comprising each two struts 41A and 41B, as is shown for the support 41 in FIG. 1. The lateral supports 41 and 42 are secured to the longitudinal beams 6 and 7 near the fastening points of the beams 9 and 10 said longitudinal beams.

The hopper 36 is held over a distance 43 by the beam 30, whereas at the front the hopper extends over a distance 44 beyond the beam 30 and over a distance 45 on the rear side. The distances 44 and 45 are approximately equal to each other and equal to about one third of the distance 43. The upper side of the hopper walls are provided with inwardly bent over rims 46 to 49. The rear rim 48 is slightly larger than the front rim 49. From the corners of the upper side of the hopper supporting rods 50 are secured to a supporting rod 51, located centrally above the hopper. The hopper 36 comprises in its lower space a worm conveyor 52, which is driven from a box 53 having transmission members and an ingoing shaft 54. The worm conveyor 52 extends throughout the length of the hopper bottom.

As is shown in FIG. 4, a hood 55 is arranged above the worm conveyor 52 so as to extend throughout the length of the hopper 36. Between the sidewalls 39 and 40 and the hood 55 material can flow towards the worm conveyor 52. The hood 55 prevents the material carried in the hopper from bearing by its full weight on the worm conveyor 52. The hopper 36 is provided near the rear side with an outlet pipe 56, which is provided with a dosing member 57. Beneath the outlet pipe 56 a spreading member 58 is arranged and supported by a vertical shaft 59, journaled in a gear box 60. The gear box 60 is held by a supporting frame 61, which is connected with the beam 10 so as to be pivotable about shafts 62 and 63. On the rear side of the supporting frame 61 a coupling member 64 is arranged by means of which the supporting frame can be fixed relatively to the frame. The coupling member 64 is connected with a bracket 65, which embraces the supporting frame 61 and is connected with the ends of the longitudinal beams 6 and 7. Between the shaft 54 and the ingoing shaft 66 of the gear box 60 an intermediate shaft 67 is connected by a universal joint with the shaft 66. The universal joint has its center located on the line of connection between the pivotal shafts 62 and 63.

On the front side the frame is provided with a drawbar 68, which comprises two forwardly converging beams 69 and 70, which are provided with a coupling hook 71. The beams 69 and 70 are connected by means of pivotal shafts 72 and 73 with the front beam 8. A supporting beam 74 is arranged between the beams 69 and 70. The ends 75 and 76 of a torsional rod 77 are coupled with the ends of the supporting beam 74. This torsional rod is connected at the center to the beam 8 by means of a support 78.

When the machine is put into use, it is coupled by means of the coupling member 71 with a prime mover, for example, a tractor. The power takeoff shaft of the tractor may be connected by means of an auxiliary shaft with the driving shaft 54. The torsional rod 77 exerts on the drawbar 68 a force in the direction of the arrow 80. Therefore, the upward movement of the drawbar 68 for attaching it to the tractor requires little energy. When the machine is moved, for example, over a field, material can be fed from the hopper 36 via the dosing member 57 to the spreading member 58. The quantity of the material fed per unit time to the spreading member 58 can be regulated by means of the dosing member 57. During the distribution of the material the spreading member 58 is driven from the shaft 54 via the intermediate shaft 67 and the transmission gear of the gear box 66. The material is thus spread over a wide strip and mainly in rearward direction. Inside the hopper the worm conveyor 52 is driven via the transmission of the box 53 so that a constant flow of material from the hopper to the outlet pipe 56 is ensured. The spreading member thus receives a uniform flow of material, which can thus be distributed uniformly over the area concerned. Owing to the arrangement of the wheels 2 to 5 on cranks which are pivotally and resiliently connected with the frame, the shocks of the machine occurring during its travel, for example, across land, will be absorbed so that the frame is loaded less heavily. Owing to the resilient connection of the wheels with the frame no vigorous jolts of the machine will occur during its movement. The material in the hopper 36 is thus prevented from becoming too compact or from dissociating its granular structure. Particularly when the hopper is filled with granular material, for example fertilizer, jolts might provoke a separation between large and small grains, which would adversely affect the uniform distribution of the material. The resilience of the frame relative to the ground wheels is therefore particularly advantageous when the machine is employed for distributing fertilizer on a field.

The size of the hopper is such that it can contain a quantity of fertilizer of about 4000 kgs. In spite of the size of the hopper 36 the construction of the frame is simple in this embodiment. The frame beams are formed substantially all by hollow pipes of rectangular section.

If desired, the dosing member 57 can be cleaned in an easy manner by detaching the coupling member 64, after which the supporting frame 61 with the spreading member 58 can be turned in downward direction about the pivotal shafts 62 and 63. The dosing member is thus easily accessible. The rods 50 hold the hopper on the upper side and a cover, for example, wax-coated tissue may be passed over said rods for protecting the hopper wholly or partly on the upper side.

Although in the embodiment shown the ground wheels 2 to 5 are resilient relative to the frame by means of helical springs surrounding the ground wheel axles, a different construction may as an alternative be used for the resilient arrangement of the ground wheels relative to the frame.

The machine shown in FIG. 5 and 6 corresponds essentially with the machine shown in FIGS. 1 to 4. Similar parts are therefore designated by the same reference numerals and not described in detail. In this machine the front beam 8 is provided with a leaf spring 81, fastened by bolts 82. The intermediate beam 74 is provided with a sleeve 83 having internal thread, into which a threaded rod 84 is screwed, which is provided at the upper end with a crank 85. The threaded rod 84 is located above the end of the leaf spring 81. To the beam 69 is secured the lower end of a shock absorber 86. The shock absorber 86 is arranged between the pivot 72 and the coupling hook 71 on the beam. From the drawbar the shock absorber extends in upward direction and is pivoted by its upper end to a support 87, which is provided by the hopper 36. In the same way as shown for the shock absorber 86, a shock absorber 88 is arranged between the hopper 36 and the beam 68.

The height 94 above the ground is approximately equal to the overall length 92 of the hopper. The hopper is resiliently held on the wheels 2 to 5 by means of the springs 15, 18, 22 and 23. The two pairs of wheels supporting the frame are located at a short distance from each other so that the distance 89 between the wheel axles exceeds only little the diameter 90 of the wheels. The distance 89 is preferably not more than 1¼-times the diameter 90. In this embodiment the distance 89 is about 1.2-times the diameter of the wheels. The hopper is arranged on the frame so that it extends over a distance 91 approximately equal to the distance 89 in front of the axles of the front wheels 2 and 4. The distance 91 is about one third of the overall length 92 of the hopper 36.

In operation the machine is moved by a tractor or a similar vehicle, for which purpose the coupling hook 71 can be attached to the tractor. This can be carried out readily since the coupling hook 71 may be arranged at a level corresponding approximately with that of the point of attachment on the tractor. The height 93 of the coupling hook 71 above the ground can be adjusted by turning the threaded rod 84 in the threaded sleeve 83. When the threaded rod 84 is turned, the drawbar 68 will turn about the pivotal shafts 72 and 73 with respect to the frame 1. The drawbar 68 is resiliently secured to the frame 1, since it bears by the threaded rod 84 on the end of the leaf spring 81, which exerts an upwardly direction force on the drawbar. The drawbar 68 is furthermore connected with the frame by means of the shock absorbers 86 and 88 via the hopper 36. The movements of the drawbar 68 with respect to the frame 1 are thus attenuated by the shock absorbers 86 and 88.

The connection of the drawbar 68 with the frame by means of the spring 81 and the shock absorbers in particularly advantageous in agricultural machines moved across uneven soil. The resilient connection of the drawbar 68 by means of the leaf spring 81 with the frame 1 and the attenuation of the movements of the drawbar 68 relative to the frame by means of the shock absorbers 86 and 88 provide an optimum stable coupling between the machine and the prime mover, for example, a tractor. The stable position of the machine is particularly desirable in an embodiment in which the machine serves for spreading material. In order to distribute the material as uniformly as possible on the field, the spreading member 58 should maintain an optimum horizontal position during the travel of the machine across the field. This stable position of the spreading member 58 with respect to the ground is also improved by the stable, substantially jolt-free run of the machine.

Thereto contributes furthermore the resilient support of the machine by means of the helical springs 15, 18 22 and 23, surrounding the axles 12 and 19. By supporting the machine by means of two pairs of wheels, which are comparatively near each other, and by supporting the hopper, which extends far to the front, by means of said connection between the drawbar 68 and the frame the coupling between the prime mover and the machine will not give rise to undesirable swinging movements of the machine. Owing to this way of supporting the frame the spreading member 58 can be arranged so that the distribution of the material is not hindered by, for example, the ground wheels.

FIG. 7 shows an embodiment in which the shock absorber 86 is surrounded by a compression spring 96. The spring 96 counteracts the upward movement of the drawbar 68. The shock absorber 88 may be surrounded in the same manner by a spring. The shock absorbers 86 and 88 thus prevent an abrupt downward movement of the drawbar 68 relative to the frame, whereas the springs 96 prevent an abrupt upward movement of the drawbar 68 relative to the frame.

In the embodiment shown in FIG. 8 the leaf spring 81 with the screw spindle 84 is replaced by a leaf spring 97, one end of which is inserted into an eyelet 98, which is secured to the intermediate beam 74. The other ends of the leaf springs 97 are provided with a sleeve 99 having internal screw thread for receiving a threaded rod 100. The threaded rod 100 is rotatably secured to the beam 8. At the upper end the rod 100 is provided with an arm 101, which by means of a pawl-and-ratchet structure (not shown), can turn the rod 100 about its longitudinal axis. The pawl-and-ratchet structure is such that the rod 100 may be turned at will in one or in the other direction. The springs 97 bear on a support 102, secured to the beam 8. By moving the sleeve 99 upwards or downwards by turning the rod 100 the position of the drawbar 68 can be changed under the action of the springs 97 relative to the frame.

Having thus described my invention, what I claim as new and desire to secure by Letters Patent of the United States is:

1. An agricultural machine for spreading distributable material comprising a frame mounted on ground wheels, a V-shapd hopper supported on said frame and a spreading member positioned beneath an outlet pipe of said hopper, said spreading member being mounted on a supporting frame which is movably connected to said frame, said hopper having an elongated shape with the long sides tapering downwardly towards one another, said frame including a supporting beam which extends along at least part of the bottom of said hopper and said hopper being secured to said support beam, said frame further including a frame portion which extends in a horizontal direction and is connected to said supporting beam with strut means.

2. A machine as claimed in claim 1, wherein said frame portion is substantially U-shaped, the limbs of said portion pointing to the rear of said machine and comprising longitudinal beams, said ground wheels having axles secured to said longitudinal beams, struts extending obliquely upwards from said longitudinal beams towards the center of said machine, said struts being connected with a further supporting beam which is secured to said first mentioned supporting beam.

3. A machine as claimed in claim 1, wherein upwardly extending lateral supporting beams support the sides of said hopper and said lateral supporting beams are connected by means of lateral supports with said frame portion.

4. An agricultural machine comprising a frame and a supply hopper mounted on said frame, said frame being supported on two pairs of ground wheels, said wheels being positioned approximately centrally of the machine and said frame including a horizontal frame part with interconnected supporting beams positioned centrally between said hopper and said frame part, one of said supporting beams being positioned along the bottom of said hopper and a second supporting beam being located below said first mentioned supporting beam, a drawbar movably connected to said frame part, said drawbar being vertically adjustable relative to said frame, at least one shock absorber being positioned between said drawbar and said frame, said drawbar being pivotally connected to said frame and said shock absorber being positioned to engage said drawbar intermediate its ends, one end of said shock absorber being fastened to said drawbar to extend upwardly, the other end of said shock absorber being connected to said hopper.

5. A machine as claimed in claim 4, wherein the upper side of said hopper has inwardly bent over rims and supporting rods are secured to said rims.

6. A machine as claimed in claim 4, wherein said hopper extends over a distance beyond the foremost ground wheels of said machine, said shock absorber being connected with the front end of said hopper.

7. A machine as claimed in claim 4, wherein a compression spring is mounted on said shock absorber.

8. A machine as claimed in claim 4, wherein said ground wheels are resiliently connected to said frame.

9. A machine as claimed in claim 8, wherein the rotary axes of the foremost ground wheels are spaced apart from the rotary axes of the rear ground wheels by a distance up to 1¼ times the diameter of a ground wheel.

10. A machine as claimed in claim 8, wherein said hopper extends beyond the rotary axes of the foremost ground wheels over a distance which is approximately equal to the distance between the rotary axes of the foremost and the rear ground wheels.

11. A machine as claimed in claim 4, wherein the height of said machine above the ground is approximately equal to the overall length of said hopper.

12. A machine as claimed in claim 4, wherein two side-by-side shock absorbers are connected between the frame and said hopper.

13. A machine as claimed in claim 4, wherein said drawbar is resiliently connected with the frame by a leaf spring positioned between said draw bar and said frame, an adjusting member associated with said frame and said drawbar for vertically adjusting the position of said drawbar relative to said frame.

14. A machine as claimed in claim 13, wherein said adjusting member is a vertical screw spindle which cooperates with said leaf spring.

15. An agricultural machine for spreading distributable material comprising a frame and an elongated supply hopper with tapering sides supported on said frame, said frame including parallel longitudinal beams that support said sides of said hopper and a draw bar connected to the front of said longitudinal beams, a centrally located frame beam extending along the bottom of said hopper and lateral support means extending from said longitudinal beams to the approximate center of said sides, said frame having four ground wheels arranged in pairs on two axles located one behind the other viewed in the direction of travel, a spreading member mounted on a hinged frame part pivoted at the rear of said frame and a bracket connecting said frame part to said frame, at least one ground wheel being mounted on said frame with resilient means whereby said frame is vertically movable relative to said ground wheel.

16. A machine as claimed in claim 15 wherein all four of said ground wheels are independently mounted on said frame with resilient means whereby said frame is vertically movable relative to each ground wheel.

17. A machine as claimed in claim 16, wherein said ground wheels are mounted on cranks journaled in the frame, and springs are associated with said cranks adjacent said frame whereby said springs exert a force on said cranks in a downward direction relative to said frame.

18. A machine as claimed in claim 17, wherein said springs are helical springs which surround the ground wheel axles and said axles are secured to the lower aspect of said frame, said cranks having parts extending to the rear from their connection with said frame relative to the direction of travel.

19. An agricultural machine comprising a frame having parallel longitudinal beams and a supply hopper having a conveyor adjacent the bottom thereof and upright sidewalls supported on said frame, said machine having two pairs of ground wheels and a draw bar pivotably connected to the longitudinal beams of said frame, supporting beam means connected to said longitudinal beams between said pairs of ground wheels, said supporting beam means including lateral beams which extend upwardly along said sidewalls, said hopper having an outlet port and a spreading member mounted at the rear of said machine below said port, means for driving said conveyor and spreader including transmission means at the front end of said hopper above said drawbar.